(12) United States Patent
Basu et al.

(10) Patent No.: US 7,437,349 B2
(45) Date of Patent: Oct. 14, 2008

(54) ADAPTIVE PROBABILISTIC QUERY EXPANSION

(75) Inventors: Sankar Basu, Tenafly, NJ (US); Milind R. Naphade, Urbana, IL (US); John R. Smith, New Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 1249 days.

(21) Appl. No.: 10/143,146

(22) Filed: May 10, 2002

(65) Prior Publication Data

US 2003/0212666 A1   Nov. 13, 2003

(51) Int. Cl.
*G06F 17/30* (2006.01)
(52) U.S. Cl. .................... 707/3; 707/4; 707/5
(58) Field of Classification Search ............ 707/1–10, 707/100–104.1, 200–206
See application file for complete search history.

(56) References Cited

U.S. PATENT DOCUMENTS

| 5,404,507 | A * | 4/1995 | Bohm et al. ............. 707/4 |
| 5,640,553 | A * | 6/1997 | Schultz ................. 707/5 |
| 5,737,734 | A * | 4/1998 | Schultz ................. 707/5 |
| 6,470,333 | B1 * | 10/2002 | Baclawski ............. 707/3 |
| 6,581,055 | B1 * | 6/2003 | Ziauddin et al. ........ 707/4 |
| 6,728,706 | B2 * | 4/2004 | Aggarwal et al. ....... 707/5 |
| 6,766,320 | B1 * | 7/2004 | Wang et al. ........... 707/5 |
| 7,152,064 | B2 * | 12/2006 | Bourdoncle et al. ..... 707/5 |

OTHER PUBLICATIONS

Ellen M. Voorhees, Query Expansion using Lexical-Semantic Relations, Jul. 3-6, 1994; Springer-Verlag—Berlin, Germany, 62-69.*
Maria Luisa Barja et al., Informia: a mediator for integrated access to heterogeneous information sources, 1998, 1-8.*
Maeda, Y., The optimal algorithm for query refinement in information retrieval, Oct. 12-15, 1999, IEEE, 522-526.*
Jae-Hyun Lin et al., Query expansion for intelligent information retrieval on Internet, Dec. 10-13, 1997, IEEE, 656-662.*
A.F. Smeaton and C.J. van Rijsbergen, The Retrieval Effects of Query Expansion on a Feedback Document Retrieval System, The Computer Journal, vol. 26, No. 3 (1983), pp. 239-246.
F. Cuna Ekmekcioglu et al., Effectiveness of Query Expansion in Ranked-Output Document Retrieval Systems, Journal of Information Science, 18 (1992), pp. 139-147.
Edward Chang and Beitao Li, MEGA—The Maximizing Expected Generalization Algorithm for Learning Complex Query Concepts, University of California, Santa Barbara, pp. 1-39.

(Continued)

*Primary Examiner*—Jean B Fleurantin
(74) *Attorney, Agent, or Firm*—Ido Tuchman

(57) ABSTRACT

A method, system and computer program for adaptively processing a query search. An expanding operation is utilized to expand the query into sub-queries, wherein at least one of the sub-queries is expanded probabilistically. A retrieving operation retrieves the results of the sub-queries, and a merging operation is used to merge the sub-query results into a search result. An adapting operation is configured to modify the search such that the relevance of the search result is increased when the search is repeated.

13 Claims, 8 Drawing Sheets

OTHER PUBLICATIONS

Milind R. Naphade and Thomas S. Huang, A Probabilistic Framework for Semantic Video Indexing, Filtering and Retrieval, University of Illinois at Urbana-Champaign, pp. 1-26.

Norbert Fuhr, Probabilistic Models in Information Retrieval, Mar. 4, 1992, pp. 1-21.

Milind R. Naphade et al., Learning to Annotate Video Databases, Pervasive Media Management Group, IBM T J Watson Research Center, Hawthorne, NY 10532, USA.

Gerard Salton and Chris Buckley, Improving Retrieval Performance by Relevance Feedback, Journal of the American Society for Information Science, 41(4):288-297, 1990.

Apostol Natsev et al., WALRUS: A Similarity Retrieval Algorithm for Image Databases.

Gregory Grefenstette, Use of Syntactic Context to Produce Term Association Lists for Text Retrieval, 15th Ann Int'l SIGIR (1992), pp. 89-96.

Yonggang Qiu and H. P. Frei, Concept Based Query Expansion, pp. 1-11.

Carolyn J. Crouch and Bokyung Yang, Experiments in Automatic Statistical Thesaurus Construction, 15th Ann Int'l SIGIR (1992), pp. 77-88.

Eugene Agichtein et al., Learning Search Engine Specific Query Transformations for Question Answering, WWW10 (May 1-5, 2001).

* cited by examiner

ADAPTIVE PROBABILISTIC QUERY EXPANSION

FIELD OF THE INVENTION

The present invention relates to searching for information in a database. More specifically, the invention relates to adaptively performing queries based on probabilistic considerations.

BACKGROUND

As the world steams full speed ahead into the digital age, the ability to effectively search and retrieve relevant information from the ever-increasing mass of electronic data becomes more and more important. One of the most common techniques for searching for relevant textual information is performing a keyword query. A keyword query searches for documents containing one or more significant words supplied by the user. Keyword searches, however, often yield poor results because the user is forced to guess which words are important to the topic at hand. Many concepts can be described in a number of ways and relevant information may not include the keywords entered.

One technique adopted to help locate more relevant documents is the use of a similarity thesaurus. Automatic query expansion or query modification based on term co-occurrence data has been studied extensively. In a simple implementation of term co-occurrence queries, the similarities between terms are first calculated based on the association hypothesis and then used to classify terms by setting a similarity threshold value. In this way, the set of index terms is subdivided into classes of similar terms. A query is then expanded by adding all the terms of the classes that contain the query terms. Classifying terms into classes and treating the members of the same class as equivalent, however, is often too simplistic an approach to find and return relevant data.

Another search strategy is the use of document classification. In this approach, documents are first classified using a document classification algorithm. Infrequent terms found in the document class are considered similar and are clustered in the same term class, referred to as a thesaurus class. The indexing of documents and queries is enhanced either by replacing a term by a thesaurus class or by adding a thesaurus class to the index data. However, the retrieval effectiveness depends strongly on some parameters that are often difficult to determine. See, for example, C. J. Crouch, B. Young, *Experiments in Automatic Statistical Thesaurus Construction*, SIGIR'92, 15th Int. ACM/SIGIR Conf. on R & D in Information Retrieval, Copenhagen, Denmark, pp. 77-87, June 1992. Furthermore, commercial databases typically contain millions of documents and are highly dynamic. Often the number of documents is much larger than the number of terms in the database. Consequently, document classification is much more expensive and has to be done more frequently than the simple term classification mentioned above.

Another known method of information mining is syntactic context. In this method, term relations are generated on the basis of linguistic knowledge and co-occurrence statistics. For each term t, the method uses grammar rules and a dictionary to extract a list of terms. This list consists of all terms that modify t. The similarities between terms are then calculated by using modifiers from the list. Subsequently, a query is expanded by adding those terms most similar to any of the query terms. This produces only slightly better results than using the original queries. See, for example, G. Grefenstette, *Use of Syntactic Context to Produce Term Association Lists for Retrieval*, SIGIR'92, 15th Int. ACM/SIGIR Conf. on R&D in Information Retrieval, Copenhagen, Denmark, pp. 89-97, June 1992. Moreover, since there do not exist any well formed syntactic structures in multimedia data, such a technique is unsuited for multimedia query expansion.

Relevance information has been used in text retrieval as well as in multimedia retrieval. In text retrieval, relevance information can be used to construct a global information structure, such as a pseudo thesaurus or minimum spanning tree. A query is expanded by means of such a global information structure. The retrieval effectiveness of this method depends heavily on the user relevance information. Moreover, different experiments (e.g., A. F. Smeaton and C. J. van Rijsbergen, *The Retrieval Effects of Query Expansion on a Feedback Document Retrieval System*, The Computer Journal, 26(3):239-46, 1983) do not yield a consistent performance improvement. On the other hand, the direct use of relevance information, by simply extracting terms from relevant documents, is proved to be effective in interactive information retrieval. This approach, however, does not provide any help for queries without relevance information. An up to date summary of this technique in the context of text/document retrieval is available in G. Salton and C. Buckley, *Improving Retrieval Performance by Relevance Feedback*, Journal of the ASIS, 41(4):288-297, 1990.

In addition to automatic query expansion, semiautomatic query expansion has also been studied. In contrast to the fully automated methods, the user is involved in the selection of additional search terms during the semiautomatic expansion process. A list of candidate terms is computed by means of one of the methods mentioned above and presented to the user who makes the final decision. Experiments with semiautomatic query expansion, however, generally do not result in significant improvement of the retrieval effectiveness in document retrieval. See, for example, F. C. Ekmekcioglu, A. M. Robertson, Willett, *Effectiveness of Query Expansion in Ranked-Output Document Retrieval Systems*, Journal of Information Science, 18(2):139-47, 1992.

Relevance feedback has also been attempted in the context of video retrieval. The problem is made more difficult by the semantic gap between high-level concepts and low-level features, and the subjectivity of human perception. A comprehensive survey of relevance feedback techniques for multimedia retrieval is found in Yong Rui, Thomas S. Huang, Michael Ortega, and Sharad Mehrotra, *Relevance Feedback: A Power Tool in Interactive Content-Based Image Retrieval*, IEEE Tran on Circuits and Systems for Video Technology, Special Issue on Segmentation, Description, and Retrieval of Video Content, pp. 644-655, Vol. 8, No. 5, September 1998. Further specific references to this topic can be found in A. Natsev, R. Rastogi, and K. Shim, *WALRUS: A Similarity Retrieval Algorithm for Image Databases*, Proc. ACM SIGMOD Int. Conf. on Management of Data, 1999 and, E. Chang and B. Li, *Mega—The Maximizing Expected Generalization Algorithm for Learning Complex Query Concepts* (extended version), UCSB Technical Report, February 2001.

A method for learning query transformation in order to improve the ability to retrieve answers to questions from web retrieval systems has been suggested in Eugene Agichtein, Steve Lawrence, Luis Gravano, *Learning Search Engine Specific Query Transformation for Question Answering*, Proceedings of the Tenth International World Wide Web Conference, WWW10, May 1-5, 2001. This system automatically learns phrase features for classifying questions into different types, automatically generating candidate query transformations from a training set of questions/answer pairs, and automatically evaluating the candidate transforms on target information retrieval systems.

A probabilistic query expansion model based on a similarity thesaurus is presented in Yonggang Qiu, H. P. Frei, *Concept Based Query Expansion*, Proceedings of SIGIR-93, 16th International Conference on Research Development in Information Retrieval. Two issues with query expansion are addressed in this article: 1) the selection and the weighting of additional search terms; and 2) the expansion of queries by adding terms that are most similar to the concept of the query, rather than selecting terms that are similar to the query terms. A survey of probabilistic information techniques is available in Nobert Fuhr, *Probabilistic Framework for Semantic Video Indexing, Filtering and Retrieval*, IEEE Transactions on Multimedia, Vol. 3, No. 1, pp. 141-151, March 2001, whereas use of relevance feedback-like techniques in the context of active learning for multimedia annotation is contained in the report, M. Naphade, Ching-Yung Lin, John R. Smith, Belle Tseng, S. Basu, *Learning to Annotate Video Databases*, Proceedings of SPIE Storage and Retrieval for Media Databases, pp. 264-275, January 2002. None of these techniques however adequately address the problem of query expansion for multimedia retrieval based on probabilistic framework coupled with user feedback.

SUMMARY OF THE INVENTION

The present invention addresses the above-identified problems with the prior art by providing a method, system and computer program product for adaptively searching for information in a database. The invention can utilize a textual and non-textual query, and can expand the query into probabilistic and deterministic sub-queries. The sub-queries are processed, with sub-query results being merged into a query result.

Thus, one aspect of the invention is a method for adaptively processing a query search. The method includes an expanding operation to probabilistically expand the query into sub-queries. A retrieving operation retrieves the results of the sub-queries, and a merging operation is used to merge the sub-query results into a search result. The method also includes an adapting operation to modify the search such that the relevance of the search result is increased when the search is repeated.

Another aspect of the invention is a system for adaptively processing a search that includes at least one query. The system comprises a query expansion module configured to probabilistically expand the query to one or more sub-queries. A sub-query processing module is configured to retrieve sub-query results, and a merging module is configured to merge the sub-query results into a search result. An adaptation module is configured to adapt the search such that the relevance of the search is increased when the search is repeated.

Yet another aspect of the invention is a computer program product embodied in a tangible media. The computer program product includes computer readable program codes coupled to the tangible media for adaptively processing a query search. A first computer readable program code is configured to cause the program to probabilistically expand the query to sub-queries. A second computer readable program code is configured to cause the program to retrieve sub-query results. A third computer readable program code is configured to cause the program to merge the sub-query results into a search result. A forth computer readable program code is configured to cause the program to adapt the search such that the relevance of the search result is increased when the search is repeated.

The foregoing and other features, utilities and advantages of the invention will be apparent from the following more particular description of various embodiments of the invention as illustrated in the accompanying drawings.

DETAILED DESCRIPTION OF THE INVENTION

Figure 1:
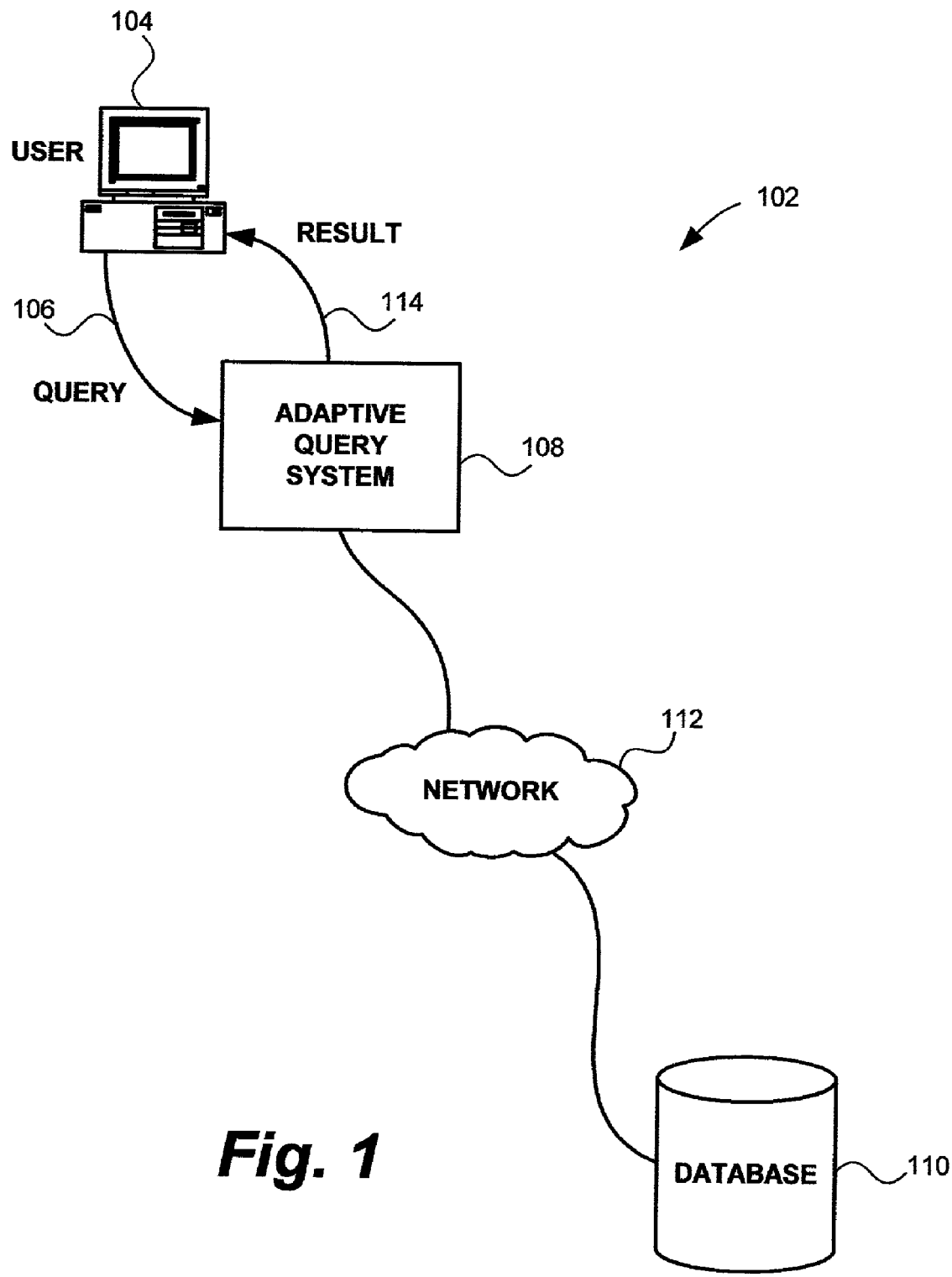
FIG. 1 shows an exemplary computer network environment embodying the present invention.

In general, the present invention is an adaptive search tool suitable for use in a computer system. The invention is described in detail below with reference to FIGS. 1-9B. When referring to the figures, like structures and elements shown throughout are indicated with like reference numerals.

In FIG. 1, one configuration of a computer environment 102 embodying the present invention is shown. The computer environment 102 includes a user 104 communicating a search query 106 to an adaptive query system 108. As detailed further below, the adaptive query system 108 expands the query 106 probabilistically to produce sub-queries. The sub-queries are then adaptively processed by the system 108 to find data matching the specifications provided in the sub-queries. Generally, this involves comparing sub-query specifications with information contained in a database 110.

Communications between the query system 108 and the database 110 may be effectuated by means of a direct connection, or through a computer network 112, such as a local area network (LAN) and/or a wide area network (WAN). Once data is retrieved from the database 110, the query system 108 merges the sub-queries results into a search result 114. The search result 114 is then passed to the user 104 for evaluation.

As discussed in more detail below, the query system 108 is configured to be adaptive. That is, the query system 108 may utilize feedback from the user 104 to find more relevant database information in successive iterations of the search. Moreover, the query system 108 may be used to search for a variety of relevant data, such as text, audio, image and video information.

Figure 2:
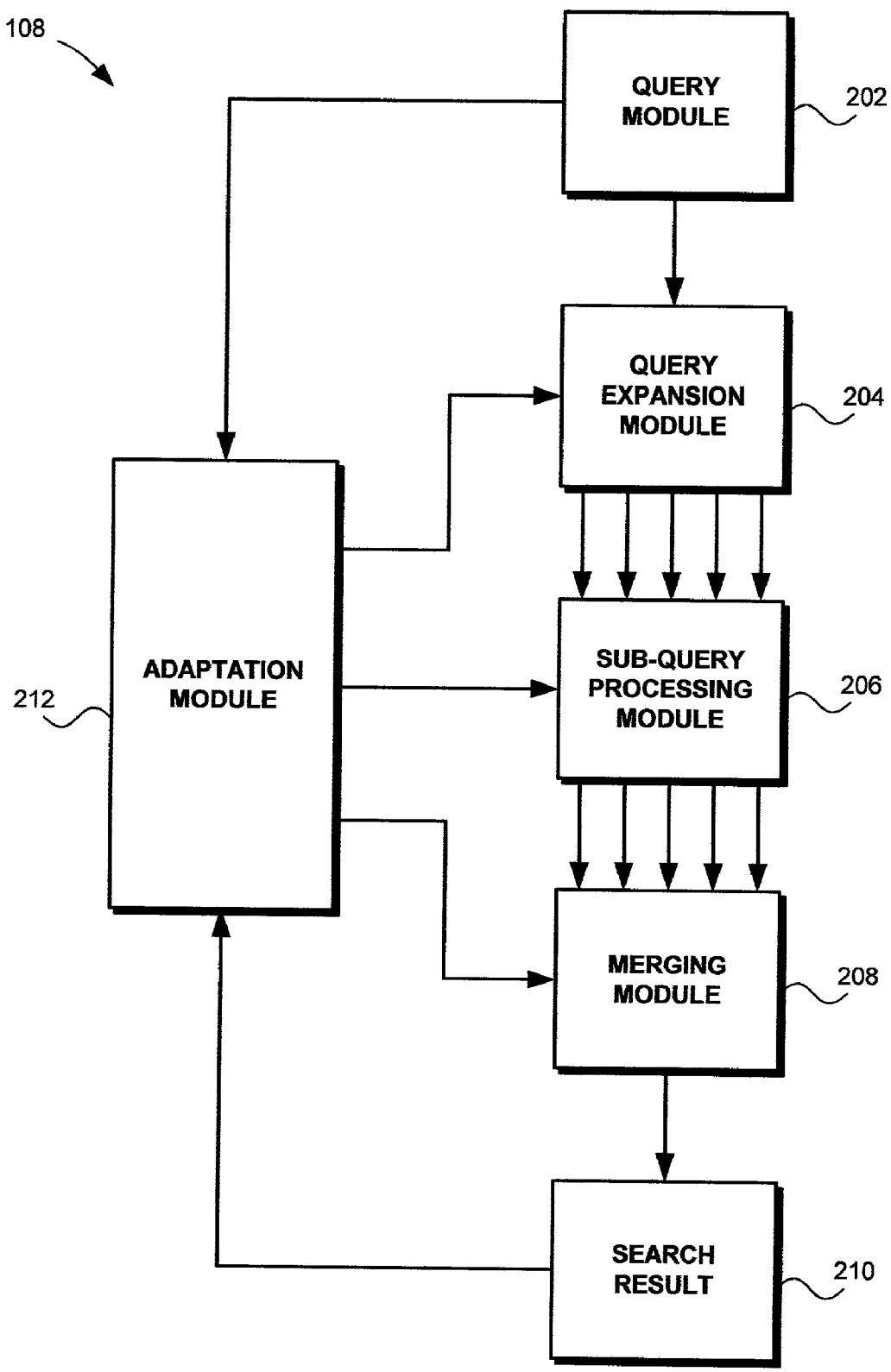
FIG. 2 shows a functional block diagram of an adaptive query system contemplated by the present invention.

In FIG. 2, a functional block diagram of the adaptive query system 108 is shown in more detail. The logical operations performed by the adaptive query system 108 may be implemented (1) as a sequence of computer implemented steps running on a computer system and/or (2) as interconnected machine modules within the computing system. The implementation is a matter of choice dependent on the performance requirements of the system applying the invention. Accordingly, the logical operations making up the embodiments of the present invention described herein are referred to alternatively as operations, steps, or modules.

The system 108 includes a query module 202 configured to receive a search query. It is contemplated that the query submitted to the query module 202 may be in the form of a textual query and/or a content query. A textual query is also referred to herein as an abstract exemplar and includes words, phrases, and sentences. Examples of a textual query are the word "sunset" and the phrase "rocket launch". A content query is also referred to herein as a content exemplar and specifies a query which includes, but is not limited to, audio, images, image sequences, video, and other spatial as well as time-series media. Examples of content queries are music clips, digital photographs, real-time surveillance sequences, movie videos, and electrocardiograms. It should be noted that text is excluded from the definition of content exemplars and is treated separately. Thus, a query received by the query module 202 is expected to be in the form of text, content, or a combination of the two.

A query may be subjective or objective. For example, the query "sunset" refers to the setting of the sun and, hence, is an abstract objective query. On the other hand, the query "beautiful evening" is termed as an abstract subjective query in so far as it is based on the user's subjective interpretations of what constitutes a beautiful evening. It is contemplated that the present invention can search both objective and subjective queries. Although subjective queries are by nature particular to the user, the query system 108 is able to learn the user's preferences though user feedback, thereby adapting the search results to the user's definition of subjective concepts.

Once a query is submitted to the query module 202, it is then probabilistically expanded into sub-queries by the query expansion module 204. Query expansion refers to the process of generating multiple sub-queries based on the issued query. A simple example of query expansion is the extension of the query term "rocket launch" into components such as "rocket", "explosion", "smoke cloud", and so on. The present invention utilizes various textual query expansion methods known to those skilled in the art, such as WordNet(r), to expand abstract queries into abstract sub-queries. WordNet is a registered trademark of the Trustees of Princeton University, Princeton, N.J. In addition, content query expansion methods known to those skilled in the art, such as MediaNet, VisualSEEk, and QBIC(r), are utilized to expand content queries into content sub-queries. QBIC is a registered trademark of International Business Machines Corporation, Armonk, N.Y.

After the sub-queries are generated, a sub-query processing module 206 receives the sub-queries from the query expansion module 204. In one embodiment of the invention, the processing module 206 translates the sub-queries into different data forms. Translating a sub-query involves mapping the sub-query into other representations. Thus, a context sub-query may be translated into an abstract sub-query by the processing module 206. For example, an image of a sunset can be mapped to the word "sunset" using known image analysis techniques. In addition, abstract-to-context translation may also be performed. For instance, the processing module 206 may provide an image of a sunset in response to the text sub-query "sunset" using a table look-up. In another embodiment of the invention, abstract-to-abstract exemplar translation is performed. For example, the word "Mercedes" is translated to the word "car". Likewise, the processing module 206 may perform context-to-context exemplar translation. For example, the processing module 206 may analyze an audio clip of the word "sunset" and generate an image of a sunset. It should be noted that sub-query translation can be configured by the user and/or system, and may not necessarily be performed in every query.

The processing module 206 is also used to retrieve sub-query results from the database. Retrieval of query results involves comparing the sub-query with target records in the database. If data contained in a target record matches the specifications in a sub-query, the target record is retrieved from the database as a sub-query result. Furthermore, the processing module 206 may be configured to analyze only a subset of the information contained in each target record. For example, the processing module 206 may analyze only the first one hundred words of a document or every tenth frame of a video sequence.

After the sub-query processing module 206 obtains the sub-query search results for the numerous sub-queries, the merging module 208 combines the intermediate results into a unified search result 210. During this process, the merging module 208 may normalize the sub-query results so that the user can more meaningfully evaluate and compare the retrieved data. For example, in a keyword frequency search, the merging module may divide the number of keyword occurrences by the document length, thereby normalizing large and small documents containing the same keyword. Thus, a normalizing operation is necessary at times to bring different types of results at par with one another.

As mentioned above, the query system 108 of the present invention is adaptive. Specifically, the system 108 includes an adaptation module 212 that attempts to refine the search results as queries are repeated over time. The adaptation module 212 is capable of modifying the query expansion module 204, the sub-query processing module 206, and the merging module 208 according to user and system feedback. For example, if a user indicates that the sub-query term "smoke" is not relevant in a "rocket launch" query, the adaptation module 212 may adaptively assign a lower probability of relevance to the "smoke" sub-query in future iterations of "rocket launch" queries. In other words, the adaptation module 212 modifies the query expansion module 204 so that the term "smoke" is assigned a lower confidence level in a "rocket launch" query. The parametric learning techniques of the adaptation module 212 may use a generative approach, including, but not limited to, probabilistic models and graphical probabilistic models and/or a discriminant approach, including, but not limited to, kernel machines, such as support vector machines and neural networks. The adaptation process of the system 108 is discussed in greater detail below.

Figure 3:
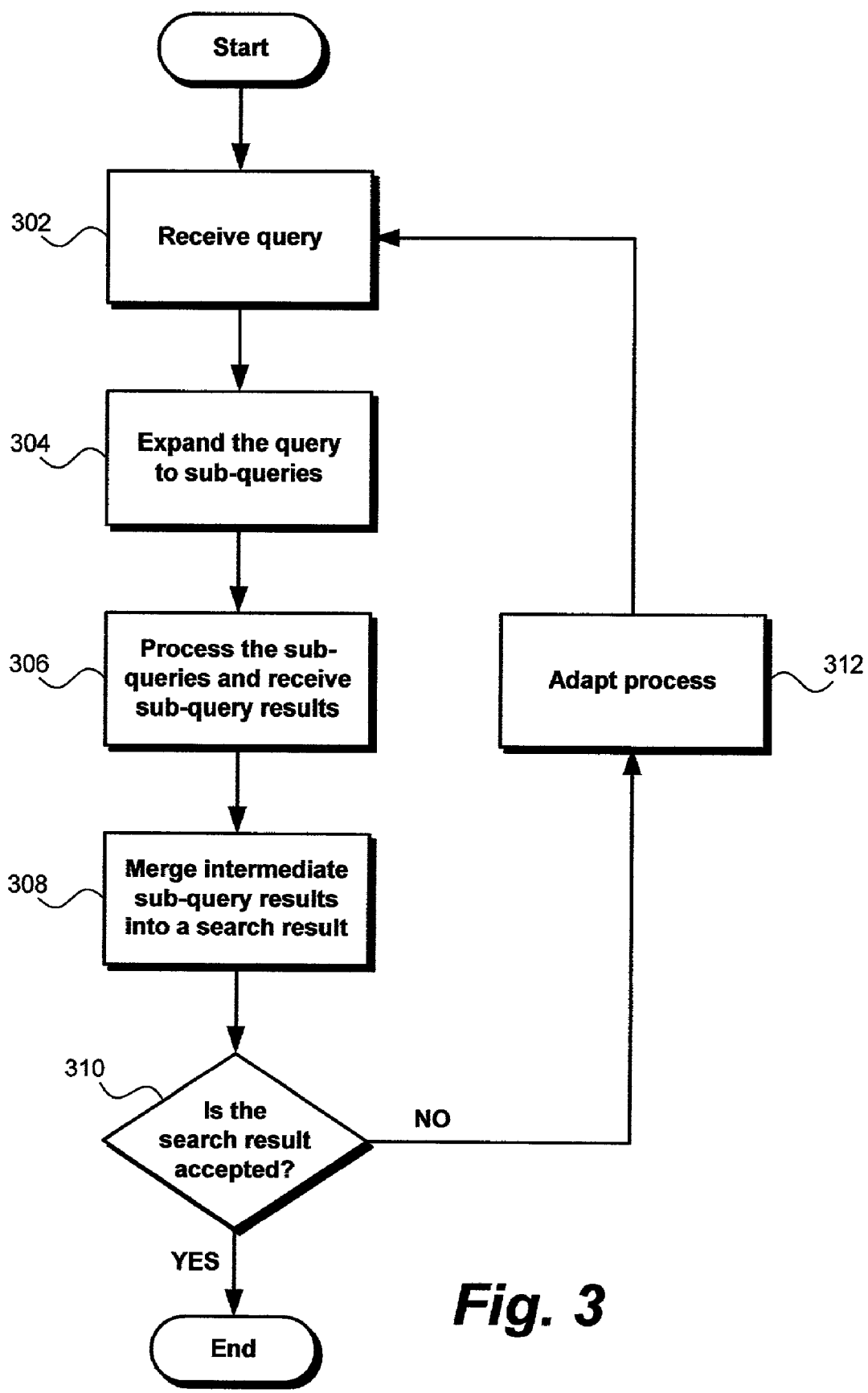
FIG. 3 shows a flow chart of an exemplary adaptive query expansion process contemplated by the present invention.

In FIG. 3, a flow chart of an exemplary adaptive query expansion process is shown. In accordance with the present invention, the adaptive query process can be a computer readable program embodied as computer readable media. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

In receiving operation 302, a query is received by the system. It is contemplated that the query can be generated by the user, the system, or a combination of both. In one embodiment of the invention, the initial query is provided by the user, while subsequent queries are generated by the system during process iterations. As mentioned above, the query may include text, images, audio, video and other media. In one embodiment of the invention, a probability distribution is assigned to the query based on the query information. For instance, in a search for sunset images, the user may include several images of a sunset as examples. The system may analyze the query images using techniques known to those skilled in the art to form a representation of a sunset in a probabilistic manner. Furthermore, the probabilistic representation of the query is modifiable by the adaptation process. After the query is received, process control passes to expanding operation 304.

In expanding operation 304, the query is expanded to sub-queries, with at least one sub-query being expanded probabilistically. As discussed above, the present invention may expand a textual exemplar into various textual sub-queries and content sub-queries. As an illustration of such query expansion, consider the query "beach" expanded to the sub-queries "sky", "water", and "sand". This example underlines the probabilistic nature of query expansion in that some images of beaches may not show the sky. Thus, the mapping of "beach" to "sky", "water", and "sand" is probabilistic rather than deterministic. The present invention is configured to handle such uncertainty by assigning a confidence level to each probabilistic sub-query. In a specific embodiment of the invention, the confidence level may be assigned using a probability mass table.

The second level of uncertainty stems from the fact that the expanded sub-query itself cannot be represented as a deterministic entity. Thus, an expansion of the "rocket launch" query into "rocket" and "explosion" sub-queries also necessitate one or more probabilistic representations of the "rocket" and "explosion" sub-queries. The mapped sub-queries are therefore probabilistic. An example of a probabilistic sub-query could be a probability distribution, with the user selecting the particular features used to represent the sub-query. As detailed below, the present invention provides an adaptation scheme whereby sub-query expansion is modifiable and learnable. For example, query expansion can be user-supervised such that sub-query confidence levels are evaluated based on user feedback. Alternatively, confidence levels can be system estimated from a set of examples provided to system.

Figure 4:
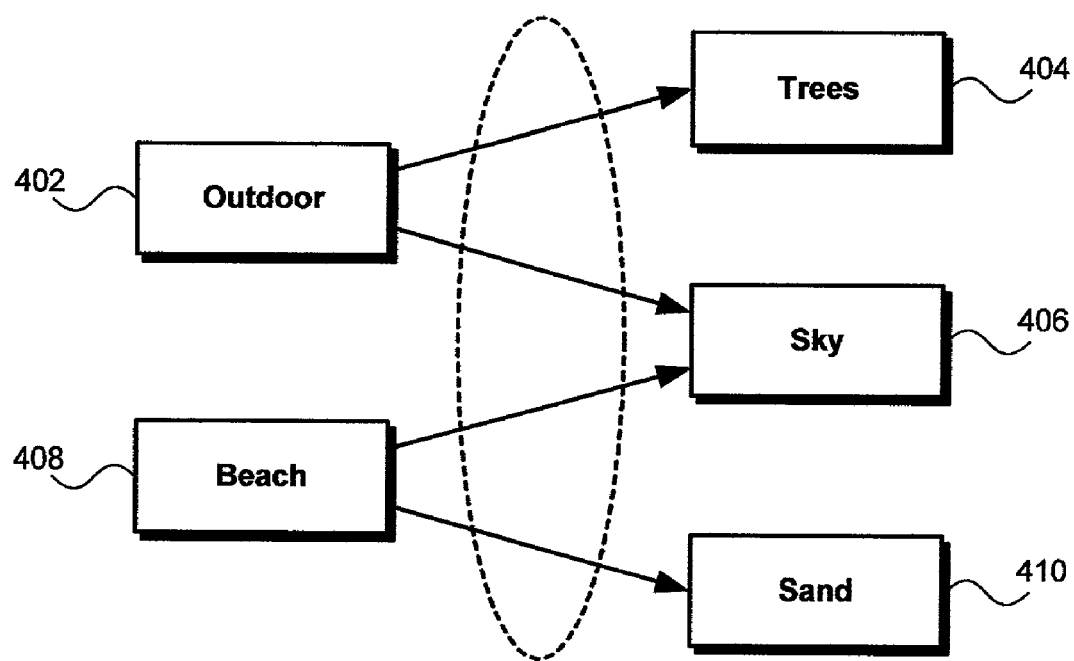
FIG. 4 shows an example of a many-to-many query expansion process.

The query expansion operation 304 may be defined by the user or developed by the system through user interaction. It is contemplated that query to sub-query expansion may be one-to-one, one-to-many, many-to-one, or many-to-many. Referring now to FIG. 4, an example of a many-to-many query expansion process is shown. The query "outdoor" 402 is shown expanded to sub-queries "trees" 404 and "sky" 406, and the query "beach" 408 is mapped to sub-queries "sky" 406 and "sand" 410. Thus, queries may be expanded to a common sub-query while also being expanded to distinct sub-queries.

Figure 5A:
FIG. 5A shows a sequential sub-query processing operation.
Figure 5B:
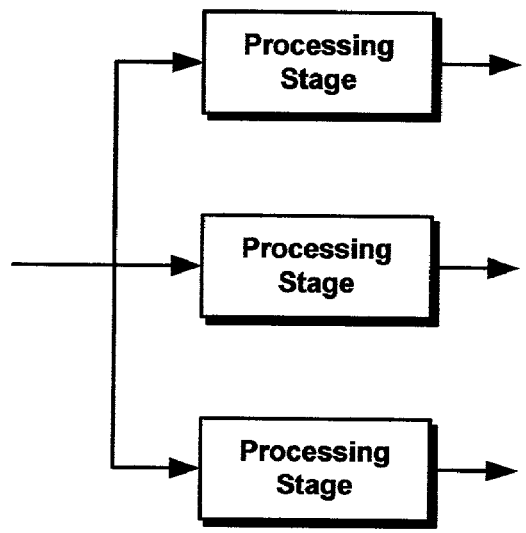
FIG. 5B shows a parallel sub-query processing operation.

Returning to FIG. 3, once the expanding operation 304 is completed, control passes to processing operation 306. As discussed above, the processing operation 306 translates the sub-queries into different data forms and retrieves sub-query results from the database. The present invention may be configured to process the sub-queries sequentially, as shown in FIG. 5A, or in parallel, as shown in FIG. 5B. Moreover, the invention may process the sub-queries using a combination of sequential and parallel processing methods.

Figure 6:
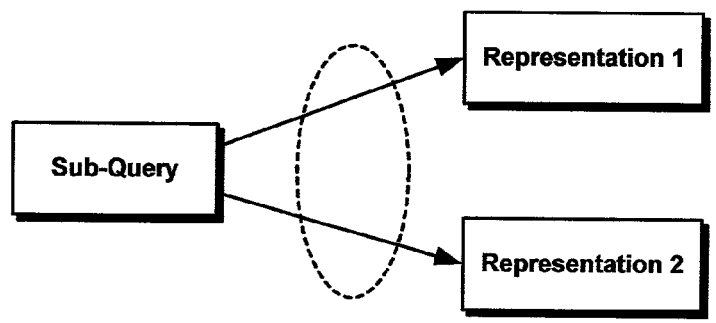
FIG. 6 shows an example of sub-query translation into sub-query representations.

The processing operation 306 may further translate sub-queries into one or more representations, as illustrated in FIG. 6. Thus, the processing operation 306 may include translating a context exemplar to an abstract exemplar, translating an abstract exemplar to another abstract exemplar, translating an abstract exemplar to a context exemplar, and translating a context exemplar to another context exemplar.

In one embodiment of the invention, abstract exemplars are translated using models for a finite lexicon of entries. Additionally, the lexicon may be system specific. For example, in a broadcast news database, the lexicon may contain entries such as "anchor", "face", etc. A database of basketball videos may contain a lexicon with terms such as "dunk", "three pointer", "Michael Jordan", etc. The lexicon may be user defined or system defined. If the lexicon is started by the user, the system may allow the user to modify the lexicon through feedback and adaptation.

In one embodiment of the invention, context exemplars are translated to abstract exemplars and the query search is based on the abstract exemplars. For example, the user may present a query in terms of an image containing a beach. The sub-query processing operation 306 may then either match these images to database images, or map the context exemplar to the abstract exemplar "beach" through the use of predefined feature representations for a beach. The processing operation 306 would then use the "beach" abstract exemplar to retrieve other similarly classified images.

The representations referred to above may be generated from finite features of different data types. For example, features for representing audio data include mel frequency cepstral coefficients and frequency domain filter bank coefficients. Features for image sequences include color representations (i.e., color histograms and color moments), structure representations (i.e., edge direction histograms), texture representations (i.e., gray-level co-occurrence matrices and Tamura texture), motion representations (i.e., motion magnitude histograms), and so on. Although such feature may be extracted automatically, the number of features and the extraction methods must be defined beforehand. It is further contemplated that the user can change such representation parameters. For example, the user can select the number of Gaussian components used to represent a color histogram.

The processing operation 306 is also utilized to retrieve sub-query search results. The retrieval process involves the use of a similarity search for each sub-query and its representations, if any. For example, if the sub-query representation is an image histogram, then the processing operation 306 may use a Histogram Intersection metric to find other images having similar histograms. In addition, the sub-query results may be listed in rank order based on the Histogram Intersection metric.

Figure 7:
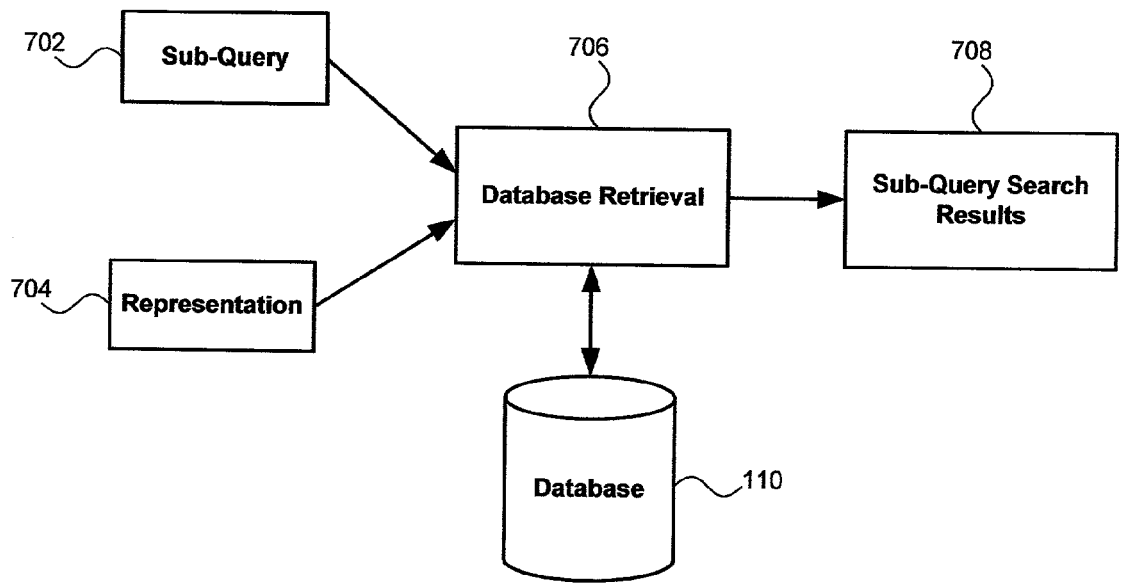
FIG. 7 shows an exemplary sub-query retrieval system.

Turning to FIG. 7, an exemplary sub-query retrieval system is shown. The retrieval system includes a sub-query 702 and a sub-query representation 704 received by a database retrieval module 706. The database retrieval module 706 searches a database 110 for data matching the sub-query 702 and sub-query representation 704. Matching data from the database 110 is delivered to a sub-query result module 708, where these intermediate results are ready to be merged. As used herein, the term "sub-query search result" includes search results from both the sub-query and any of the sub-query representations.

Figure 8:
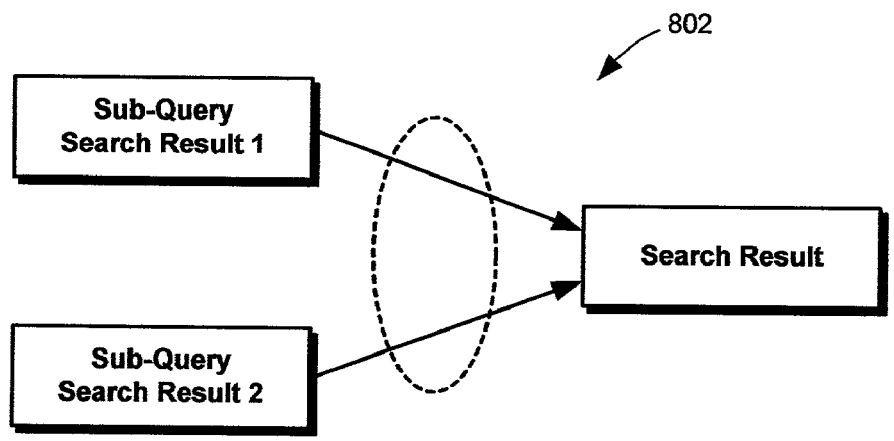
FIG. 8 shows an exemplary merging system contemplated by the present invention.

Returning again to FIG. 3, after the processing operation 306 returns the sub-query search results, control passes to merging operation 308. The merging operation 308 compiles the various sub-query search results and presents a unified list of retrieved results. The merging operation 308 may be deterministic or probabilistic, and may be user-defined or system defined. In FIG. 8, an exemplary merging system 802 of the present invention is shown. The merging system 802 may be modifiable, thus permitting adaptation.

Returning to FIG. 3, once the merging operation 308 complies a unified search result, control passes to conditional operation 310. At this stage, the search result is presented to the user and the user indicates if the result is acceptable. If the search result is accepted, the process ends. If, however, the search result does not yield the required information, process control passes to adapting operation 312.

At adapting operation 312, the search process is modified in an attempt increase the relevance of the search result when the search is repeated. Although the adapting operation 312 is shown executed after the merging operation 308, it is contemplated that the adapting operation 312 may be performed during any stage of the search process. Furthermore, the adapting operation 312 may be performed several times during the search. Thus, the adaptation operation 312 may be performed during query expansion, sub-query processing and result merging.

Figure 9A:
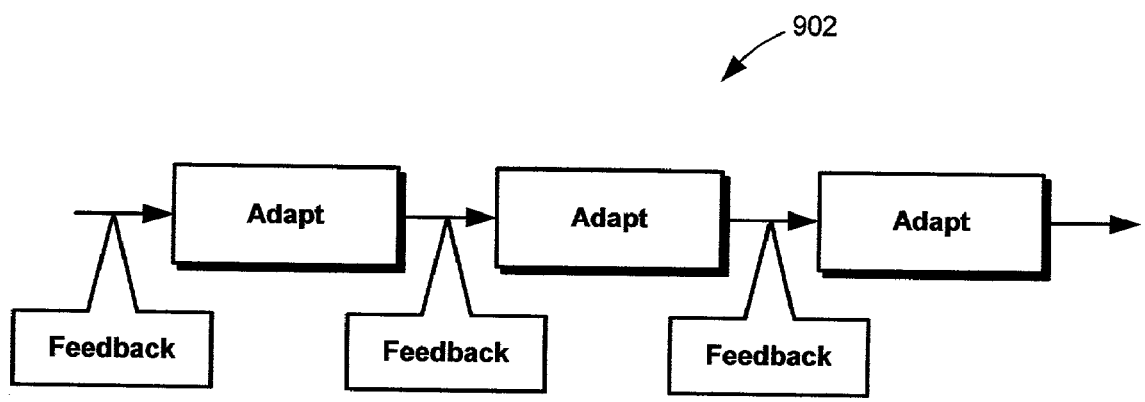
FIG. 9A shows an exemplary sequential adaptation system.
Figure 9B:
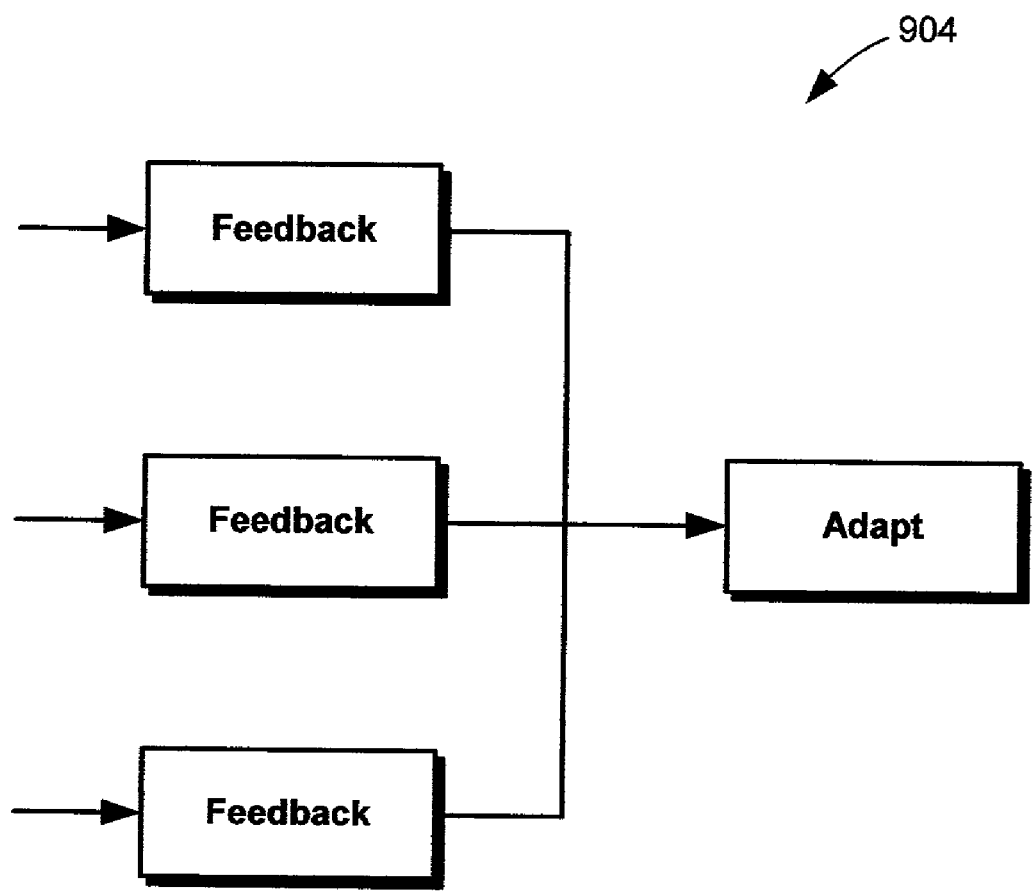
FIG. 9B shows an exemplary parallel adaptation system.

The present invention implements sequential adaptation, parallel adaptation, or a combination thereof. In FIG. 9A, a sequential adaptation system 902 based on three iterations of feedback is shown. An example of such a system is relevance feedback, where the user provides a new query example during each iteration of the search. In FIG. 9B, a parallel adaptation system 904 based on a batch of multiple simultaneous feedback is shown. For example, the user may provide a large number of positive and negative examples as feedback to retrain the model of a submitted query.

The adaptation module of the probabilistic query expansion component of the search involves modification of the probabilistic mapping used in query expansion. For example, if a user provides a query "beautiful evening" and the user's feedback suggests that the user does not agree with the system returning beach images, the adaptation can personalize the expansion to exclude the "beach" sub-query from the user's query. The probabilistic mapping can be a conditional probability table and adaptation can imply change of the probability mass functions. Such a change can be affected using frequency counting, relevance feedback, expectation maximization algorithms, and other methods known to those skilled in the art.

The adaptation module of the sub-query processing component of the search involves modification of the sub-query representations and mappings between the different kinds of exemplars. For example, the abstract exemplar "explosion" can be represented by a hidden Markov model and adaptation will affect change in the transition and observation parameters of the hidden Markov model. Adaptation can change the modules that compute proximity for content-to-content matching. Adaptation can also change the sequential processing and parallel processing systems. Finally, the adaptation module for the merging component of the search modifies the merging process based on user feedback.

The foregoing description of the invention has been presented for purposes of illustration and description. Thus, the above description is not intended to be exhaustive or to limit the invention to the precise form disclosed, and other modifications and variations may be possible. The embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A method for adaptively processing a query search, the method comprising:
   probabilistically expanding the query to sub-queries;
   retrieving sub-query results;
   merging the sub-query results into a search result;
   adapting the search such that the relevance of the search result is increased when the search is repeated; and
   storing the search result in tangible computer readable memory; and
   wherein expanding the query to sub-queries includes assigning a confidence level to the at least one of the sub-queries, wherein the confidence level is based on a probability of relevance.

2. The method of claim 1, wherein at least one of the sub-queries is probabilistic.

3. The method of claim 1, wherein adapting the search includes modifying the operation of expanding the query to sub-queries.

4. The method of claim 1, wherein adapting the search includes modifying the operation of retrieving sub-query results.

5. The method of claim 1, wherein adapting the search includes modifying the operation of merging the sub-query results.

6. The method of claim 1, further comprising translating a content sub-query to a textual sub-query.

7. The method of claim 1, further comprising translating a textual sub-query to a content sub-query.

8. The method of claim 1, wherein merging the sub-query results of the sub-queries includes normalizing the sub-query results.

9. The method of claim 1, wherein adapting the search is performed iteratively based on user feedback.

10. The method of claim 1, wherein adapting the search further comprising iteratively repeating the expanding, retrieving, merging and adapting operations until the search result is accepted.

11. The method of claim 1, further comprising receiving an initial search query from a user.

12. The method of claim 1, further comprising sending the search result to the user.

13. The method of claim 1, further comprising receiving query feedback from the user.

* * * * *